EFFECT OF CATALYST CONCENTRATION ON REACTOR FOULING
(RANGE OF APPROX. 20-40% REDUCTION OF TITANIUM IN PREMIXER)

Joseph K. Mertzweiller   Inventor

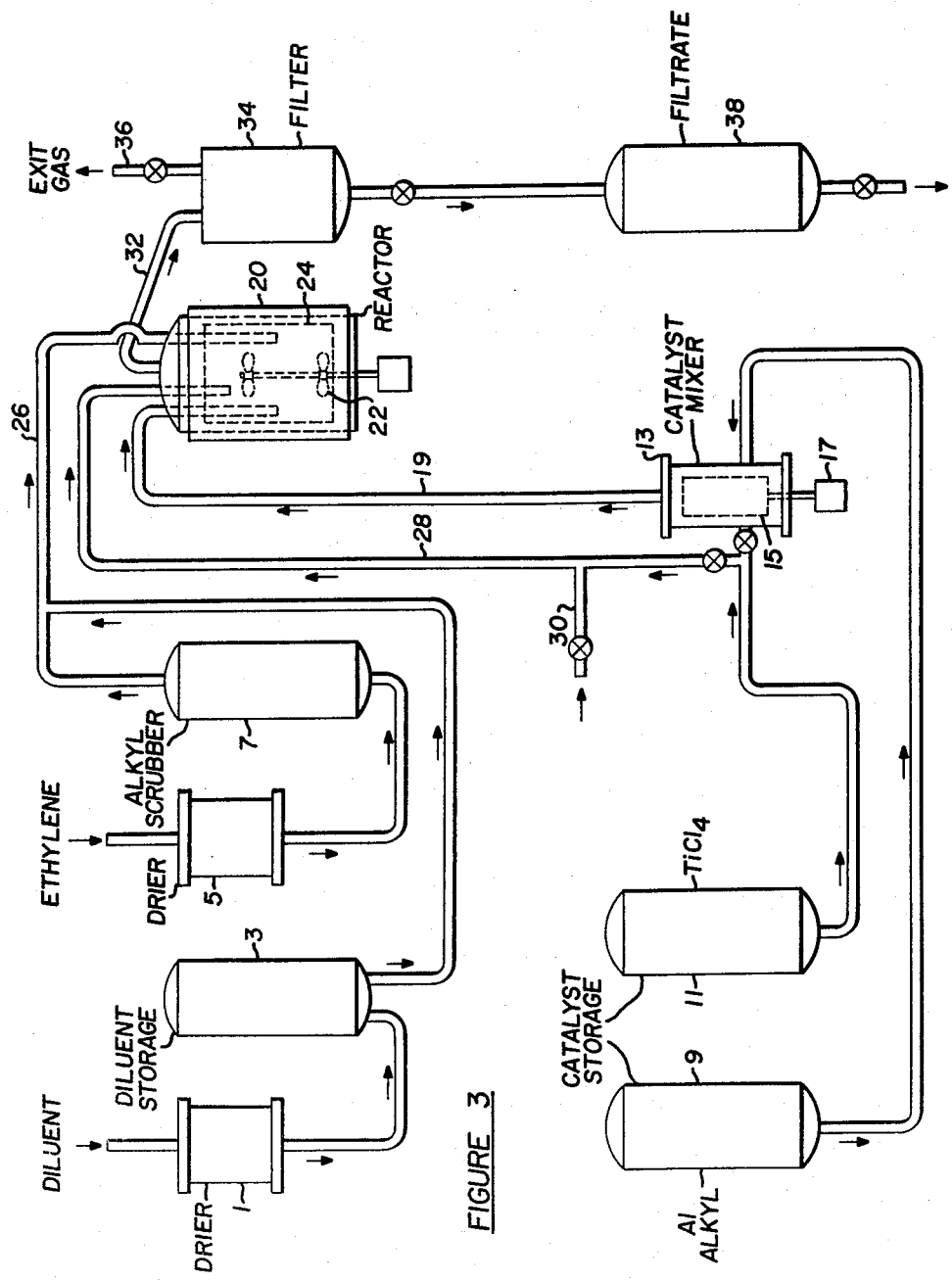

United States Patent Office 2,962,491
Patented Nov. 29, 1960

2,962,491
OLEFIN POLYMERIZATION

Joseph Kern Mertzweiller, Baton Rouge, La., assignor to Esso Research and Engineering Company, a corporation of Delaware Filed Dec. 21, 1955, Ser. No. 554,501

7 Claims. (Cl. 260—94.9)

The present invention relates to the polymerization of olefins. More particularly, the invention pertains to the polymerization of olefins at relatively low pressures for the production of olefin polymers of high molecular weight useful as "plastics" and to the preparation of catalysts therefor.

In one of its aspects, the invention involves the polymerization of olefins, such as ethylene, to polymers, such as polyethylene of high molecular weight, at relatively low pressures in the presence of catalysts obtained by reacting a reducing metal-containing material, such as an alkyl aluminum compound, with a reducible heavy metal compound, such as a heavy metal halide, while controlling catalyst composition and/or concentration in such a manner as to avoid reactor fouling. The invention also contemplates the use of catalyst components and/or extraneous metal compounds to control the product molecular weight insofar as it is affected by the new method of controlling reactor fouling.

Prior to the present invention it has been found that ethylene and other olefins such as propylene, isobutylene, etc., may be polymerized at relatively low pressures not substantially exceeding atmospheric pressure when using various combinations of reducing metals or metal compounds, e.g. alkali and alkaline earth metals, their hydrides and alloys; aluminum compounds, such as aluminum hydride, aluminum alkyls, e.g. trialkyls, alkyl aluminum halides, etc., with various reducible heavy metal compounds, such as the halides, acetyl acetonates, etc., of the metals of groups IV–VI and VIII of the periodic system, e.g. of titanium, zirconium and iron. In this reaction the olefin is contacted with the catalyst suspended and/or dissolved in a liquid solvent or diluent.

Among the most active types of catalyst for this reaction are combinations of trialkyl aluminum or dialkyl aluminum halide with titanium tetrahalide. More specifically, excellent results have been obtained when using combinations of triethyl aluminum or diethyl aluminum chloride with titanium tetrachloride, obtained by simply mixing the catalyst components at atmospheric temperature in suitable solvents. These catalysts have been found to afford high yields of good quality, high molecular weight, solid, high softening point polymers of ethylene and other olefins even at pressures as low as, or closely approaching, atmospheric pressure.

In conventional operation, the catalyst components have been either premixed or added separately to the polymerization reactor in concentrations varying over a wide range. In either case, it has been observed that a polymer film tenaciously adhering to reactor surfaces forms in the early stages of the reaction and continues to grow at a relatively rapid rate until reactor inlets and outlets and frequently the entire reactor space are plugged or "fouled" by this difficultly removable polymer deposit. This effect is appreciable in batch operation but particularly pronounced and bothersome in continuous operation where frequent shut-downs for equipment cleaning may be necessitated. Fouling in the form of film formation on reactor surfaces may take place at rates as high as 0.1 lb. of fouling deposit per hour per lb. of polymer produced. It will be appreciated that such fouling rates seriously interfere with the continuity of commercial operations normally carried out in equipment involving the use of relatively narrow spaces and passageways and requiring good heat transfer characteristics.

The present invention overcomes, or at least greatly alleviates, these drawbacks and affords various additional advantages as will appear from the subsequent description wherein reference will be made of the accompanying drawing in which:

Figure 3 is a simplified flow plan of process equipment adapted to practice the invention.

Figure 1:
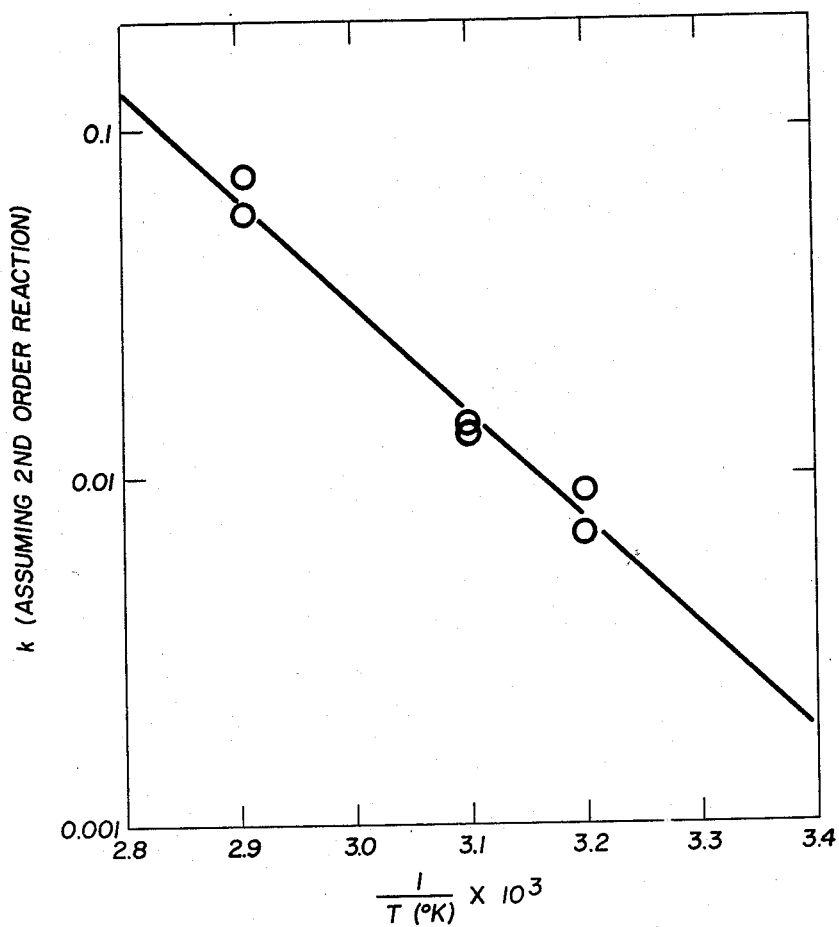
Figure 1 is a graphical illustration of the kinetics of the reduction reaction involved in the preparation of catalysts in accordance with the invention.

It has now been found that reactor fouling in the polymerization process above described may be practically eliminated or at least radically reduced by maintaining the degree of reduction of the heavy metal component of the polymerization catalyst prior to the polymerization reaction at such a level that further reduction thereof during the polymerization reaction proper is held to a minimum. Preferably more than 30% by weight of the original heavy metal compound is so reduced to a lower valency state prior to the polymerization reaction. For example, in the system alkyl aluminum-titanium tetrachloride, the catalyst components should be premixed in such proportions and such conditions as will be conducive to a reduction of at least 30% of the $TiCl_4$ to $TiCl_3$ or compounds of even lower valency titanium. These compounds of lower valence states are either insoluble or only slightly soluble in the usual hydrocarbon diluent.

It has been found that the concentration of the premixed total catalyst in the medium of the polymerization reaction proper likewise has a strong effect on the fouling tendency of the process. More specifically, within a concentration range of 0.01–1 wt. percent of total catalyst in the polymerization reaction medium, the fouling rate in lbs. of fouling deposits per hour per lb. of polymer product (lb./hr./lb.) is a direct function of the catalyst concentration. In order to reduce the fouling rate significantly by this control method, the total catalyst concentration should not exceed about 0.3 wt. percent and is preferably held at 0.01–0.2 wt. percent of the polymerization reaction medium.

Best results are obtained when this control of total catalyst concentration during polymerization is combined with a control of the degree of catalyst reduction prior to polymerization as above described. It should be understood, however, that highly significant improvements are obtained even when employing either control alone.

In a more basic sense the fouling appears to be related to the total quantity of titanium which is reduced during the course of the polymerization reaction. Apparently, the titanium halide so reduced is strongly adsorbed on reactor walls and agitators; this reduced titanium halide is also the most active polymerization site with the result that polymer is formed as a film on the vessel walls and agitators. The reduced halide is also strongly adsorbed on the polymer film with the result that the film thickness increases during the progress of a run and, if not controlled, will result in poor heat transfer and poor control of polymerization temperature. The greater the total quantity of titanium reduced during the course of a polymerization run the greater the fouling rate. Other factors which affect fouling in addition to the above described extent of pre-reduction and total catalyst concentration are aluminum/titanium mole ratio, polymerization temperature and pressure. In general, any factor which favors less reduction of titanium during polymerization (e.g. lower temperature and lower Al/Ti ratio) also favors less fouling. Fouling rates are slightly less at increased pressure.

Further experiments have indicated that increasing the degree of reduction of the heavy metal component in the catalyst is conducive to a pronounced increase in the molecular weight of the polymer product. While this may be desirable for many purposes, even up to molecular weights as high as 300,000 or higher (as determined by the intrinsic viscosity method using the I. Harris Correlation, J. Polymer Science, 8, 361 (1952)), molecular weights above about 150,000 entail disadvantages whenever molding or extruding is an indispensable part of the polymer finishing procedure. Effective molecular weight control is, therefore, frequently desirable when employing the most efficient fouling control methods of the invention. It has been found that this may be accomplished by adding to the polymerization reaction proper a metal halide which will act as chain terminating agent. Suitable for this purpose are particularly the unreduced halides of the heavy metals, or mono-alkyl dihalides such as aluminum bromide, or ethyl aluminum dibromide or ethyl aluminum dichloride. These metal halides or alkyl dihalides may be used in concentrations of about 0.002–0.2 wt. percent in the polymerization reaction medium.

An outstanding example of this embodiment may be illustrated with the aid of the alkyl aluminum-titanium tetrachloride system. As the percent reduction of the titanium fed to the polymerization reactor increases the fouling rate decreases; at constant total catalyst concentration the molar concentration of $TiCl_4$ in the reactor decreases, and molecular weight increases. To control both fouling and molecular weight it is thus necessary to control both the extent of titanium reduction in the catalyst premixing step at not less than 30% reduction of Ti and the actual $TiCl_4$ concentration in the polymerization reactor. As pointed out above, fouling is directly related to the amount of $TiCl_4$ reduced (by aluminum alkyl or alkyl halide) in the polymerization stage. It has also been established that $TiCl_4$ concentration in the polymerization stage is generally about $\frac{1}{10}$ of that in the catalyst premixing stage and at comparable temperature and holding time the reduction rate is proportionately decreased; also the concentration of the reducing agent, such as alkyl aluminum, is very much decreased as is the ratio of reducing agent/$TiCl_4$. This results in further decreases in the rate of titanium reduction in the reactor. Thus, a small incremental concentration of $TiCl_4$ added directly to the reactor aids in holding down molecular weight, if desired, in the preferred range of 20,000–150,000, by functioning principally as a chain terminating agent. It is convenient to add the incremental $TiCl_4$ or other metal halide in solution in the liquid medium used as diluent in the polymerization reaction. Of course, excessive reduction of $TiCl_4$ in the course of the reaction should be avoided to prevent excessive reactor fouling.

In many cases, the presence of unreduced metal halide in the polymerization reactor results in cutting down the polymerization reaction rate. For this reason, it may be desirable to add small amounts of the reducing metal compound together with the chain terminating metal halide to the polymerization reaction. In a system of the type just mentioned, trialkyl aluminum or dialkyl aluminum halide may be added to activate the polymerization process and aluminum halide or monoalkyl aluminum dihalide to act as a chain terminator and to control molecular weight. A very convenient way to do this is to add ethyl aluminum "sesquichloride" or "sesquibromide" (the product from the reaction of aluminum metal and ethyl chloride or ethyl bromide) to the polymerization reactor along with the premixed catalyst. This method allows control of molecular weight in the desirable range of 20,000–150,000 by maintaining the sum of the molar concentration of $TiCl_4$ and $AlRX_2$ in the range of 0.010–0.020 for polymerization of ethylene at atmospheric pressure to 300 p.s.i.g.

Aluminum compounds of outstanding utility for catalyst systems contemplated by the present invention include triethyl aluminum, tripropyl aluminum, tri-isopropyl aluminum, tri-isobutyl aluminum, diethyl aluminum halides, di-isobutyl aluminum halides, di-aryl aluminum halides, etc. Other suitable aluminum compounds are dimethyl aluminum halides, trimethyl aluminum, higher dialkyl aluminum halides and trialkyl aluminum compounds having alkyl groups higher than about $C_{10}$. Mixtures of alkyl aluminum compounds can also be used to reduce heavy metal compounds. For example, mixtures containing ethyl aluminum dichloride and diethyl aluminum chloride or bromide have been successfully used to produce active catalysts in this manner. Similarly, mixtures of ethyl aluminum dichloride and triethyl aluminum or of diethyl aluminum chloride and triethyl aluminum can be used. All these compounds as well as methods for their preparation are well known in the art. Quite generally, in addition to trialkyl or aryl aluminum compounds, organo-aluminum compounds carrying two hydrocarbon radicals or at least one hydrocarbon radical and one hydrogen, as well as an electron attracting group, such as an alkoxy, halogen, organic nitrogen or sulfur radical, etc., may be used.

Other suitable reducing materials include the alkali and alkaline earth metals, their alloys, hydrides and their alkyl and/or aryl compounds, as well as quite generally the alkyl and aryl derivatives of other metals which have sufficient stability to permit reaction in their compound form with a reducible heavy metal compound.

Compounds suitable as the heavy metal component of the catalyst include such inorganic compounds as the halides, oxyhalides, complex halides, oxides, hydroxides, and organic compounds such as alcoholates, acetates, benzoates and acetyl acetonates of the transition metals of the IV, V, VI and VII periods of the periodic system, e.g. titanium, zirconium, hafnium, thorium, uranium, vanadium, niobium, tantalum, chromium, molybdenum, tungsten and manganese, as well as iron and copper. The metal halides, particularly the chlorides, are generally preferred, titanium and zirconium being the most active of these metals. The following heavy metal compounds which are relatively readily reducible are particularly useful: titanium tetrabromide, titanium tetrachloride and zirconium acetylacetonate. Relatively difficultly reducible compounds of lesser utility include ferrous chloride, chromic chloride and manganese chloride.

Particularly striking results have been obtained by applying the present invention in the presence of catalysts prepared by reacting triethyl aluminum, diethyl aluminum bromide or chloride or mixtures of diethyl aluminum halide with triethyl aluminum as the reducing agent with titanium tetrachloride as the heavy metal component.

The specific conditions described apply particularly to catalysts for ethylene polymerization. In general, a similar relationship exists for other olefins although the catalyst pretreatment, concentration range and aluminum/titanium ratio may differ for different olefins, e.g. olefins having 2–6 carbon atoms or more.

The catalysts are quite generally prepared by intimately mixing the aluminum compound or other reducing component and the heavy metal compound in a solvent or diluent and in a non-oxidizing atmosphere while maintaining the catalyst concentration within the limits specified. Normally liquid paraffinic hydrocarbons, such as hexane, heptane, water white, diesel oil or other saturated petroleum or synthetic hydrocarbon oils, are the most suitable solvents or diluents. Other suitable solvents include aromatic and cycloparaffinic hydrocarbons, such as benzene, xylene, cyclohexane, etc. Different mutually compatible solvents may be used to dissolve the individual catalyst components prior to mixing.

Time and temperature of the catalyst preparation process depend largely on the type of catalyst involved and the polymer to be reduced. Quite generally, the temperature may range between about −60° and +200° F. for mixing times of about 1–60 minutes. As a rule, the temperature may be the lower and the time the shorter within the ranges specified, the higher the reducing activity of the reducing agent and/or the more readily reducible the heavy metal compound. However, in accordance with the present invention, these conditions should be so correlated that at least, and preferably more than, 30% of the heavy metal compound is reduced to a lower state of oxidation. This may be accomplished by various methods. In general, the percent reduction is determined from the second order kinetic relationships $$K = \frac{1x}{ta(a-x)}$$

in which $t$=time in seconds; $a$=initial molar concentration of Ti and Al and $x$=molar concentration of Ti in time $t$. The relationship between K and premix temperature for diethyl aluminum chloride—TiCl$_4$ is shown in Figure 1.

The molar ratio of the aluminum compound or other reducing agent to the heavy metal compound in the catalyst mixture may vary widely. Quite generally, the higher the polymer molecular weight desired the higher should be this ratio. A preferred molar ratio for alkyl aluminum compounds to titanium tetrachloride for making polymers above 20,000 average molecular weight is about 0.3–12:1, molar ratios of 0.5–1:1 and even substantially equimolar proportions, based on metal, being suitable in many cases.

The polymerization process of the invention is carried out at temperatures and pressures normally used heretofore in the low pressure polymerization of olefins to prepare high molecular weight polymers suitable as "plastics" and for similar purposes. These conditions depend somewhat on the specific olefin involved and on the type of polymer desired. Ethylene is the preferred olefin although higher olefins, such as propylene, butylenes, etc., may be used alone or in mixtures. The polymers produced have molecular weights above 2,000 and may range as high as from 300,000–3,000,000 and more, as determined by the intrinsic viscosity method referred to above. In the case of ethylene, the polymerization is carried out by intimately contacting gaseous ethylene with the catalyst of the invention, for example by bubbling the ethylene into a suspension of the catalyst in an inert solvent or diluent. Neither the polymerization temperature nor the polymerization pressure is particularly critical. It is preferred, however, to operate at temperatures of about 30°–500° F., preferably 70°–200° F.

Pressures ranging anywhere from atmospheric or subatmospheric to 250 atmospheres have been used heretofore in the low pressure polymerization of ethylene and other olefins on catalysts of the type here involved. Similar pressures may be used for the purposes of the invention, although pressures ranging from atmospheric to about 500 p.s.i.g. are preferred. Thus, it may be stated that pressures of atmospheric to about 20 atmospheres are sufficient for ethylene polymerization to form "plastics" type polymers in accordance with the present invention. The polymerization of higher olefins, such as propylene or butylenes, may require somewhat higher pressures of, say, about 10–30 atmospheres, although solid polypropylene may be prepared at atmospheric pressure on some high activity catalysts of the type described herein.

The reaction is preferably carried out under careful exclusion of oxygen while stirring in batch or continuous operation. When operating batchwise, olefin introduction is continued until the catalyst is exhausted and the reaction ceases. In order to permit stirring even after the formation of substantial amounts of solid polymer, solvents may be used. These solvents, which should be liquid at the operating conditions, include aliphatic, hydroaromatic and aromatic hydrocarbons, such as pentane, hexane, higher paraffins, cyclohexane, tetrahydronaphthalene, decahydronaphthalene, benzene, xylene, halogenated aromatic hydrocarbons, e.g. mono- and dichlorobenzenes; ethers such as dibutyl ether, dioxane, tetrahydrofurane; and mixtures thereof. The polymer concentration in the reaction mixture may be about 5–30%.

The amount of catalyst used may vary within wide limits depending somewhat on the purity of the olefin feed and the diluent. Proportions of as little as 0.1 part by weight of catalyst per 1,000 parts by weight of olefin are sufficient if the feed is pure. With olefin feed streams containing about 0.01% of water, oxygen, carbon dioxide or certain other oxygenated compounds, catalyst proportions of about 0.5–5 wt. percent are usually adequate. However, in accordance with the teachings of the present invention it is highly desirable, particularly in continuous operation, to adjust the amount of total catalyst so as not to exceed a concentration of about 0.3% by weight of the liquid diluent supplied to the polymerization reaction.

When it is desired to control product molecular weight by the addition of metal halides acting as chain terminating agents, these halides may be added to the polymerization reaction prior or during the olefin introduction. The halides, preferably dissolved or suspended in the same diluent as is used for the polymerization reaction, may be supplied in a single batch or in increments in the course of the polymerization reaction.

Upon completion of the polymerization reaction, the catalyst is completely deactivated by the addition of an alcohol, such as i-propyl or n-butyl alcohol in amounts of about 10–100 times the amount of catalyst used. The reaction slurry is then filtered, the filter cake reslurried in a catalyst solvent, such as warm concentrated alcohol, at about 120°–200° F. for about 15–60 minutes, filtered again and the filter cake dried, preferably under reduced pressure. Ash residues in the polymer are reduced below about 0.05% by this procedure.

The polymers produced by the present invention are at least equal in quality and, in many cases superior, to those produced by low pressure polymerization processes using different catalysts. This and other more specific aspects of the invention will be best understood by reference to the following specific examples.

EXAMPLE I

The effect of the degree of reduction of the titanium tetrachloride component of an alkyl aluminum-titanium tetrachloride catalyst system on the fouling rate of the ethylene polymerization reaction is illustrated by the following experiments.

Four different catalysts were prepared by intimately mixing in a nitrogen atmosphere a composite of 76% by weight of diethyl aluminum chloride and 24% by weight of ethyl aluminum dichloride with varying amounts of titanium tetrachloride at varying conditions conducive to different degrees of reduction of the TiCl$_4$. The diluent was a 400°–500° F. acid treated heavy naphtha in all cases.

The catalysts were prepared under continuous mixing conditions at the temperatures, concentrations and holding times indicated below. Ethylene was introduced at 150° F. and pressures ranging from about 10 p.s.i.g. to about 300 p.s.i.g. at a reaction time of 1–2 hours. The ethylene feed rate was 0.5–0.7 lb. of C$_2$H$_4$/hr.

At the end of each run the solid product polymer was separated by filtration, quenched with an excess of n-butanol, washed with butanol and acetone and dried. The fouling rate was determined as follows: Upon termination of the runs the reactor was washed with fresh diluent to remove any polymer slurry; the adhering film or mass fouling was recovered, washed, dried and weighed.

The detailed conditions and results of these runs are tabulated in Table I below.

Table I

| Run No. | 1 | 2 | 3 | 4 |
|---|---|---|---|---|
| Catalyst | \multicolumn{4}{c}{$AlEt_2Cl$ (76%)—$AlEtCl_2$ (24%) +$TiCl_4$} |
| Catalyst Premix Conditions: | | | | |
| Temperature, °F | 122 | 116 | 127 | [1] 115 |
| Concentration, Ti Molar | 0.0148 | 0.020 | 0.041 | 0.035 |
| Holding Time, Seconds | 660 | 900 | 1,320 | 3,720 |
| Ti Reduced, percent of $TiCl_4$ Fed | 11 | 18 | 37 | 60 |
| Polymerization: | | | | |
| Total Catalyst, wt. percent in Diluent at Equil | 0.12 | 0.18 | 0.29 | 0.16 |
| $TiCl_4$, Molar in Reactor | 0.0018 | 0.0023 | 0.0027 | 0.0014 |
| Fouling Rate, lb./hr./lb | 0.097 | 0.038 | 0.005 | 0.0005 |
| Molecular Weight of Polymer X $10^{-3}$ | 275 | 190 | 186 | 450 |
| Holding Time, Minutes | 60 | 90 | 90 | 102 |
| Yield, gm. polymer/gm. catalyst | 42 | 45 | 26 | 59 |

[1] Average.

The above data show that the fouling rate is an inverse function of the degree of reduction of the $TiCl_4$ fed to the polymerization reaction and that low fouling rates require a degree of reduction of more than 30% of the $TiCl_4$ initially supplied. It will also be observed that the molecular weight of the product is lower at the higher concentration of unreduced $TiCl_4$ in the polymerization reactor. It is evident, therefore, that the addition of extraneous unreduced $TiCl_4$ will further depress the molecular weight, whenever this is desired. This fact is further borne out by the following batch experiments.

A catalyst was prepared by mixing equimolar proportions of diethyl aluminum chloride and titanium tetrachloride and heating the mixture for 15 minutes at 120° F. A portion of the catalyst was used to polymerize ethylene at about 140°–150° F. and atmospheric pressure. The polymer had a molecular weight averaging about 116,000. To another portion of this catalyst enough $TiCl_4$ was added, after the pretreatment but prior to polymerization to reduce the Al:Ti ratio to 0.67. This catalyst yielded a polyethylene of about 60,000.

EXAMPLE II

Three catalysts of different degrees of $TiCl_4$ reduction were prepared by subjecting solutions of the components in the same hydrocarbon diluent to varying continuous pretreating conditions of time and temperature. Catalyst A consisted of equal molar proportions of $AlEt_2Cl$, $AlEtCl_2$ and $TiCl_4$ and was not pretreated, but contacted with ethylene immediately upon mixing in the polymerization reactor. Catalyst B had about the same composition as catalyst A but was pretreated for 27 min. at 150° F. Catalyst C was the same as that of run 4 of Example I and was pretreated for 60 min. at 115° F. All other conditions were essentially like those described in Example I unless indicated differently in Table II below.

Table II

| Polymerization Run No. | 5 | 6 | 4 |
|---|---|---|---|
| Catalyst | A | B | C |
| Total Catalyst Concentration at Equil | 0.17 | 0.30 | 0.16 |
| Total Al/Ti Ratio | 2.0 | 2.1 | 2.2 |
| $Et_2AlCl/TiCl_4$ Mol Ratio | 1.0 | 1.0 | 1.1 |
| Percent Ti Reduced in Catalyst Premixer | ([1]) | 56 | 60 |
| Catalyst Efficiency, gms./gm | 21 | 29 | 59 |
| Fouling Rate, lb./hr./lb | 0.125 | 0.004 | 0.0005 |
| Molecular Weight X $10^{-3}$ | 70 | 46 | 450 |

[1] No premix.

Again the relationship between degree of $TiCl_4$ reduction and fouling rate as well as product molecular weight is evident.

EXAMPLE III

The effect of the presence of chain terminating unreduced metal halides in the polymerization reaction on the molecular weight of the product polymer is further illustrated by the following experimental data.

Catalyst were prepared by continuous premixing of solutions containing about equimolar quantities of $AlEt_2Cl$ and $TiCl_4$. These catalyst mixtures were pretreated as described in the above examples to attain different degrees of $TiCl_4$ reduction. The catalysts so prepared were used for the polymerization of ethylene essentially as described in Examples I and II. The conditions and results of these experiments are summarized below in Table III in comparison with those of run Nos. 3, 5 and 6 of the above examples.

Table III

| Run No. | 5 | 6 | 7 | 8 | 9 | 3 |
|---|---|---|---|---|---|---|
| Catalyst | 50/50 $AlEt_2Cl$ $AlEtCl_2$ with $TiCl_4$ | | | 74/26 $AlEt_2Cl$ $AlEtCl_2$ with $TiCl_4$ | | |
| Pretreatment: | | | | | | |
| Time | | 27 | 63 | | 11 | 22 |
| Temperature, °F | | 150 | 153 | | 124 | 127 |
| Percent Reduction of Ti in Premix | [1] 0 | 56 | 70 | [1] 0 | 16 | 37 |
| Polymerization: | | | | | | |
| Sum of Molar Conc. of Unreduced $TiCl_4$ and $EtAlCl_2$ | 0.0085 | 0.0155 | 0.0055 | | 0.0049 | 0.0052 |
| Total Catalyst Conc., wt. percent in Diluent | 0.17 | 0.30 | 0.11 | 0.24 | 0.15 | 0.29 |
| Fouling Rate, lb./hr./lb | 0.125 | 0.004 46 | 0.0005 480 | 0.5 | 0.018 195 | 0.005 186 |
| Mol. wt. X $10^{-3}$ | 7 | | | | | |

[1] No premix.

While the effect of $TiCl_4$ reduction on reactor fouling is again evident, the decrease of product molecular weight with increasing concentration of unreduced metal halide and mono-alkyl aluminum dihalide is equally pronounced.

EXAMPLE IV

Figure 2:
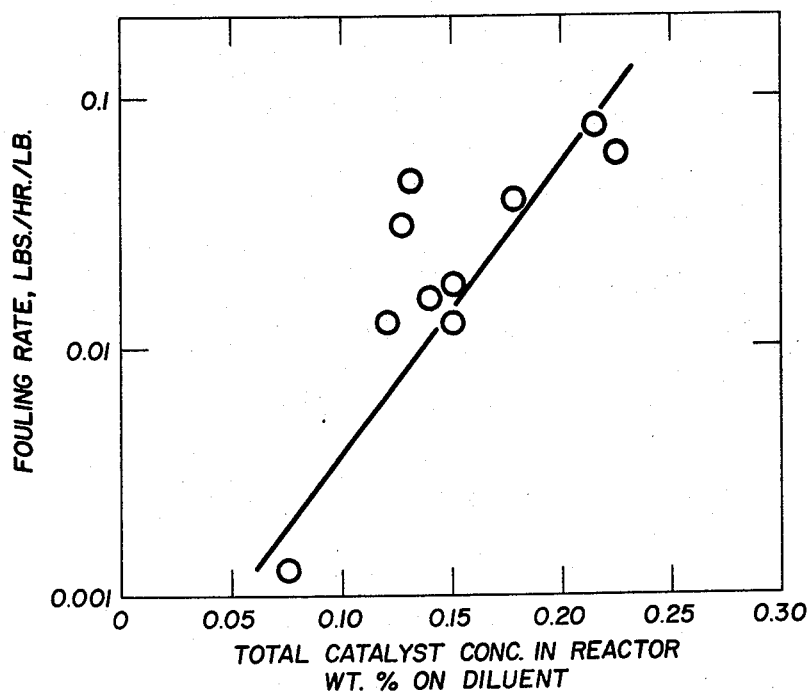
Figure 2 is a graphical illustration of effects resulting from the invention.

The total catalyst concentrations in wt. percent of diluent used in several polymerization runs over a fairly narrow range of premix reduction (20–40%) were plotted against reactor fouling rates in the same runs on a logarithmic scale. The approximate straight line correlation shown in Figure 2 of the drawing resulted. It is evident from this correlation that maintaining the catalyst concentration low within the range of 0.01–0.1 wt. percent will greatly reduce reactor fouling.

Having described the general nature of the invention as well as specific chemical and physical characteristics thereof, the invention will be further explained with reference to Figure 3 of the drawing, using the production of polyethylene of about 20,000–500,000 molecular weight in a continuous system practically free of reactor fouling as an example. While specific catalysts, starting materials and reaction conditions will be recited, it should be understood that these may be varied within the scope of the preceding disclosure.

Referring now to Figure 3, the reaction diluent, such as normal heptane or other hydrocarbon diluent is dried in drier 1 by contact with activated alumina and passed to storage vessel 3. Gaseous ethylene is dried in drier 5 with activated alumina and passed to scrubber 7 wherein it is scrubbed with an alkyl aluminum compound, such as aluminum tri-octyl to remove traces of oxygen, moisture and other poisons. Simultaneously, as alkyl aluminum compound, such as diethyl aluminum chloride is stored in vessel 9 in the form of a 1% solution in heptane or other hydrocarbon diluent, such as a kerosene of 400°–500° F. boiling range. Titanium tetrachloride is stored in vessel 11 in the form of a solution of similar concentration in a similar solvent. The two catalyst components are supplied to catalyst mixer 13 which is advantageously provided with stirring and scraping means 15 impelled by motor 17. The ratio of diethyl aluminum chloride to titanium tetrachloride in mixer 13 is preferably about 0.3–3.0 The temperature in mixer 13 is preferably maintained at about 80°–150° F. and catalyst flow rate is so controlled that catalyst residence time in mixer 13 of about 10–15 minutes is provided to assure a $TiCl_4$ reduction of more than 30 wt. percent.

The pretreated catalyst mixture is passed via line 19 to reactor 20 which is provided with stirrer 22 and preferably a draft tube 24 and which should be designed for pressures up to 500 p.s.i.g. Reactor 20 also receives, via line 26, a mixture of purified ethylene from scrubber 7 and diluent from vessel 3.

In order to maintain the molecular weight at the desired low level, unreduced $TiCl_4$ solution may be by-passed around mixer 13 and passed via line 28 directly to reactor 20. As an alternative, extraneous metal halide or alkyl dihalide may be supplied via line 30. At the conditions and for the purpose of the present example, the feed rates of the various materials supplied to reactor 20 and the conditions maintained therein may be controlled about as follows:

Diluent is fed to reactor 20 to give 0.2–4 hours holding time, while the ethylene feed rate, which depends on catalyst activity, is set to give at least 50% conversion of the ethylene fed. Premixed catalyst is added to give 0.02–0.3 wt. percent in the diluent with the unreduced $TiCl_4$ concentration controlled in the range of 0.001–0.02 molar in the reaction medium, depending on the molecular weight desired. Pressures are in the range of 10–500 p.s.i.g. and polymerization temperatures in the range of 100°–200° F.

Product polymer suspended in diluent is withdrawn via line 32 to a filling device 34 from which excess gas may be vented via line 36. Filtrate is recovered in storage vessel 38 for reuse, if desired. The polymer collected in filter 34 may be freed of ash by treatment with butyl alcohol or in any other conventional manner.

The invention is not limited to the specific figures of the foregoing examples. The relative proportions of the materials used and the reaction conditions may be varied within the limits indicated in the specification to obtain products of varying characteristics.

What is claimed is:

1. The process for polymerizing alpha olefins and reducing reactor fouling tendencies which comprises forming a catalyst mixture by intimately contacting an alkyl aluminum halide with a tetrahalide of a metal of group IV–B of the periodic system at a temperature between about −60 to 200° F. and reducing more than 30% of said reducible heavy metal compound to a lower valency state, adding to an inert liquid diluent from 0.01 to 0.2 wt. percent of said catalyst mixture and from 0.002 to 0.2 wt. percent of an unreduced halide of a metal selected from the group consisting of aluminum and group IVB, group VB and group VIB metals, both based on the weight of diluent, and contacting the resulting mixture with a polymerizable olefin at a temperature between 30° and 500° F.

2. The process of claim 1 in which said heavy metal compound is titanium tetrachloride and said olefin is ethylene.

3. The process according to claim 1 in which the metal halide is titanium tetrachloride.

4. A process according to claim 1 in which the alkyl aluminum halide is an alkyl aluminum sesquihalide.

5. A process according to claim 1 in which the heavy metal compound is titanium tetrachloride.

6. A process according to claim 1 in which a part of the metal halide is added incrementally during the polymerization.

7. The process according to claim 1 in which the alkyl aluminum halide and the tetrahalide of group IVB are premixed in the presence of a liquid diluent.

References Cited in the file of this patent

UNITED STATES PATENTS

| | | |
|---|---|---|
| 2,721,189 | Anderson et al. | Oct. 18, 1955 |
| 2,839,518 | Brebner | June 17, 1958 |
| 2,850,488 | Baxter et al. | Sept. 2, 1958 |
| 2,905,645 | Anderson et al. | Sept. 22, 1959 |

FOREIGN PATENTS

| | | |
|---|---|---|
| 534,792 | Belgium | Jan. 31, 1955 |
| 540,459 | Belgium | Aug. 31, 1955 |
| 538,782 | Belgium | Dec. 6, 1955 |
| 533,362 | Belgium | May 16, 1955 |
| 502,597 | Canada | May 18, 1954 |